United States Patent
Duffy et al.

(10) Patent No.: US 11,651,537 B2
(45) Date of Patent: May 16, 2023

(54) GENERATING VISUAL FEEDBACK

(71) Applicant: SOCIÉTÉ BIC, Clichy (FR)

(72) Inventors: David Duffy, Zürich (CH); Bernadette Elliott-Bowman, Leatherhead (GB)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/643,088

(22) Filed: Dec. 7, 2021

(65) Prior Publication Data
US 2022/0198729 A1 Jun. 23, 2022

(30) Foreign Application Priority Data

Dec. 21, 2020 (EP) .................................. 20315500

(51) Int. Cl.
| | | |
|---|---|---|
| *G06T 11/60* | (2006.01) | |
| *G06F 16/33* | (2019.01) | |
| *G06F 40/20* | (2020.01) | |
| *G06V 30/142* | (2022.01) | |
| *G06F 3/04883* | (2022.01) | |

(Continued)

(52) U.S. Cl.
CPC .......... *G06T 11/60* (2013.01); *G06F 3/03545* (2013.01); *G06F 3/04883* (2013.01); *G06F 16/3344* (2019.01); *G06F 40/20* (2020.01); *G06T 13/80* (2013.01);
(Continued)

(58) Field of Classification Search
CPC ..... G06T 11/60; G06T 13/80; G06T 2200/24; G06F 40/20; G06F 16/3344; G06F 3/03545; G06F 3/04883; G06V 30/1423; G06N 3/02
See application file for complete search history.

(56) References Cited

U.S. PATENT DOCUMENTS

2006/0217979 A1* 9/2006 Pahud .............. H04N 21/23412
375/E7.006
2009/0058860 A1 3/2009 Fong et al.
(Continued)

OTHER PUBLICATIONS

Extended European Search Report dated Jun. 4, 2021 in European Patent Application No. 20315500.7 (11 pages, in English).
(Continued)

*Primary Examiner* — Afroza Chowdhury
(74) *Attorney, Agent, or Firm* — Bookoff McAndrews, PLLC

(57) ABSTRACT

A method for generating visual feedback based on a textual representation comprising obtaining and processing a textual representation, identifying at least one textual feature of the textual representation, assigning at least one feature value to the at least one textual feature, and generating visual feedback based on the textual representation. The generated visual feedback comprises at least one visual feature corresponding to the at least one textual feature. A system for generating visual feedback based on a textual representation, comprising a capturing subsystem configured to capture the textual representation, a processing subsystem configured to identify at least one textual feature and to generate visual feedback based on the textual representation, and a graphical user output configured to display the generated visual feedback. The visual feedback generated based on the textual representation comprises at least one visual feature corresponding to the at least one textual feature.

20 Claims, 6 Drawing Sheets

(51) Int. Cl.
*G06F 3/0354* (2013.01)
*G06T 13/80* (2011.01)
*G06N 3/02* (2006.01)

(52) U.S. Cl.
CPC .......... *G06V 30/1423* (2022.01); *G06N 3/02* (2013.01); *G06T 2200/24* (2013.01)

(56) References Cited

U.S. PATENT DOCUMENTS

2009/0195656 A1  8/2009  Zhou et al.
2019/0304157 A1  10/2019  Amer et al.

OTHER PUBLICATIONS

Minfeng Zhu et al., "DM-GAN: Dynamic Memory Generative Adversarial Networks for Text-To-Image Synthesis," 2019 IEEE/CVF Conference on Computer Vision and Pattern Recognition (CVPR), 2019, pp. 5795-5803, doi: 10.1109/CVPR.2019.00595.
Yu-Liang Hsu et al., "An Inertial Pen With Dynamic Time Warping Recognizer for Handwriting and Gesture Recognition," in IEEE Sensors Journal, vol. 15, No. 1, pp. 154-163, Jan. 2015, doi: 10.1109/JSEN.2014.2339843.
International Search Report and Written Opinion dated Feb. 2, 2022 in International Application No. PCT/EP2021/084005 (14 pages).
Aach, Til, and Alexandru P. Condurache. "Transformation of adaptive thresholds by significance invariance for change detection." IEEE/SP 13th Workshop on Statistical Signal Processing, 2005. IEEE, 2005.

* cited by examiner

GENERATING VISUAL FEEDBACK

CROSS REFERENCE TO RELATED APPLICATION(S)

This application claims benefit from European patent application 20315500.7 filed on Dec. 21, 2020, its content being incorporated herein by reference.

TECHNICAL FIELD

This specification relates to a computer-implemented method for generating visual feedback based on a textual representation, and to a system for generating visual feedback based on a textual representation.

BACKGROUND

Algorithms to gain an understanding of a text and to generate a corresponding image or video from the text have emerged in recent years. Such algorithms can be configured to generate an image or a video illustrating linguistic or semantic features of the text. In so doing, objects or actions in the text can be visualized. Given the arbitrariness or complexity of a text, gaining an understanding of the text and generating a corresponding image or video based on the text represents an open context problem that can be solved based on a machine learning algorithm and/or a language model. As an example, such a machine learning algorithm can comprise a generative adversarial network (GAN).

SUMMARY

According to a first aspect, there is provided a computer-implemented method for generating visual feedback based on a textual representation. The method comprises obtaining and processing a textual representation. The method further comprises identifying at least one textual feature of the textual representation. The method further comprises assigning at least one feature value to the at least one textual feature. The method further comprises generating visual feedback based on the textual representation, wherein the generated visual feedback comprises at least one visual feature corresponding to the at least one textual feature, wherein the at least one visual feature is amplified based on the at least one feature value assigned to the at least one textual feature.

According to a second aspect, there is provided a system for generating visual feedback based on a textual representation. The system comprises a capturing subsystem configured to capture the textual representation provided by a user of the system. The system further comprises a processing subsystem configured to identify at least one textual feature of the textual representation and to generate visual feedback based on the textual representation. The system further comprises a graphical user output configured to display the generated visual feedback to the user of the system. The visual feedback generated based on the textual representation comprises at least one visual feature corresponding to the at least one textual feature.

Dependent embodiments of the aforementioned aspects are given in the dependent claims and explained in the following description, to which the reader should now refer.

The method according to the first aspect (or an embodiment thereof) and/or the system according to the second aspect (or an embodiment thereof) advantageously boost autodidactic learning and also proves useful in education. Providing immediate or contemporary visual feedback to a user, in particular, to a pupil or a student, on his or her writing a text potentially expedites learning (e.g., how to write or read, or how to write or read in another language). In fact, such intuitive visual feedback may contribute to reducing the number of pupil-teacher supervision iterations needed to arrive at a given learning objective. This can be especially advantageous for autodidactic learners or when a teacher is out of reach for the pupil, the latter a circumstance typically encountered during homework and/or silent study sessions. As a result, the method and/or the system of this specification may reduce frustration and thus increase overall engagement of the pupil with writing tasks. Furthermore, visual feedback opens up new visual and/or temporal learning dimensions supporting visual learners or adding to the neuroplasticity in a student's brain. Amplifying visual features relating to the text or to portions thereof (viz. to textual features) can be used, in examples, upon rewarding a particular language or style choice, to make a pupil reflect on the value of specific language or style used or on the impact of changes to phrasing or word use. The visual feedback system further enables the pupil or student to explore alterations to the text and study the corresponding changes in the visual feedback. In an embodiment, the visual feedback is interactive in that the pupil or student can select one or more of the visual features and learn about the corresponding textual feature in the text. The method and system of this specification are in line with ever-increasing digitization in education and teaching.

FIGURE DESCRIPTION

FIG. 1 schematically illustrates a computer-implemented method according to the first aspect for generating visual feedback based on a textual representation.

FIG. 2a schematically illustrates an example system according to the second aspect for generating visual feedback based on a textual representation.

FIG. 2b schematically illustrates an example system according to the second aspect comprising a touchpad, a touch screen, or a graphics tablet.

FIG. 2c schematically illustrates an example system according to the second aspect comprising a digital pen, e.g. a smart pen.

DETAILED DESCRIPTION

An intuitive computer-implemented method implemented in a (computer) system provides visual feedback to a user on a text, e.g. a text written by hand or pen. Visual feedback 10 comprises one or more of an image, an animated image, a video, and an output text based on the text and shows at least one visual feature 40 amplified or emphasized depending on e.g. the language or style used in the text. Amplification magnitudes can e.g. be determined based on many linguistic factors such as language complexity, rarity, importance or value, or visual features 40 such as the scale of changes in videos due to a language choice.

Implementations disclosed herein may reduce the amount of computing resources used to provide visual feedback 10. For example, instead of transmitting visual feedback 10 (e.g., image, video, etc.), text may be transmitted across a network and/or between two electronic components. The text may consume a fraction of the storage space that is consumed by visual feedback 10. Accordingly, the text may be transmitted faster than transmitting visual feedback 10 and, as a result, the transmission may require less bandwidth. Accordingly, implementations disclosed herein may allow use of less storage space, faster transmissions, and an overall more efficient computing experience.

Figure 3A:
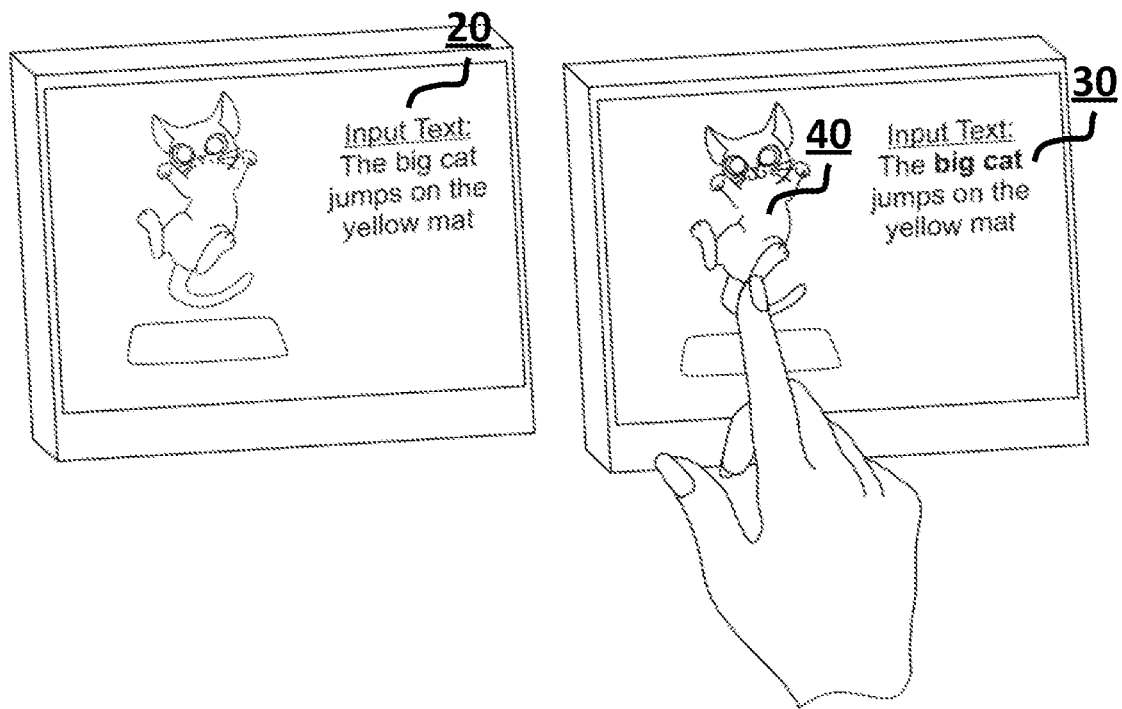
FIG. 3a illustrates an example of a visual feature corresponding to a textual feature in visual feedback based on a textual representation.
Figure 3B:
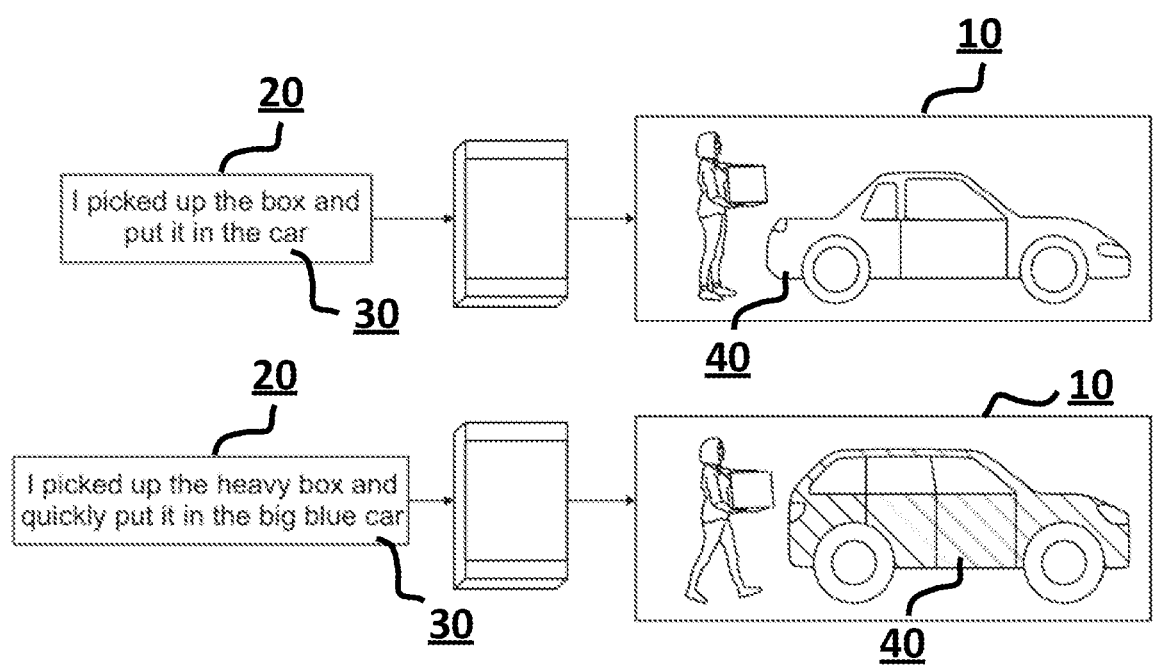
FIG. 3b illustrates another example of a visual feature corresponding to a textual feature in visual feedback based on a textual representation.

As an example, FIG. 3a illustrates a visual feature 40 (e.g. a big cat) corresponding to a textual feature 30 (e.g. "big cat") in the visual feedback 10 generated for a textual representation 20 (e.g. "The big cat jumps on the yellow mat"). As another example, FIG. 3b illustrates a visual feature 40 (e.g. a car) corresponding to a textual feature 30 (e.g. "the car") in the visual feedback 10 generated for a textual representation 20 ("I picked up the box and put it in the car").

Figure 1:
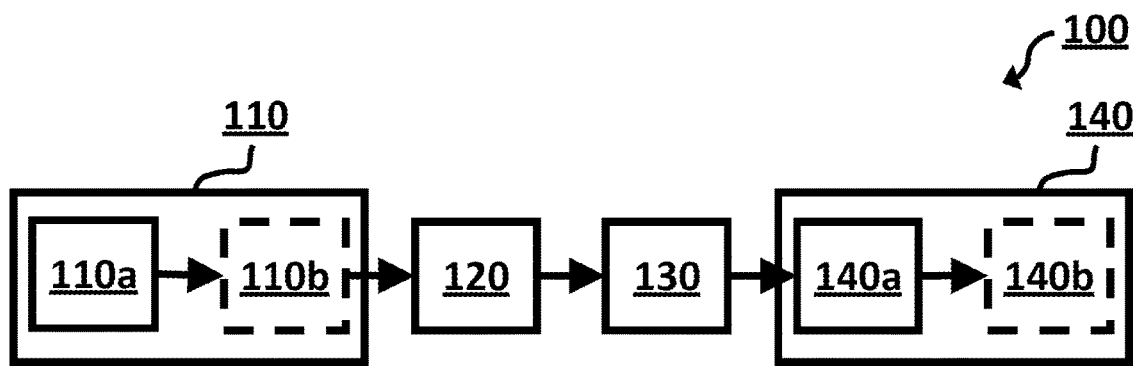

FIG. 1 schematically illustrates the computer-implemented method according to the first aspect for generating visual feedback based on a textual representation. The computer-implemented method 100 for generating visual feedback 10 based on a textual representation 20 comprises obtaining and processing 110, 110a, 110b a textual representation 20. Processing 110b the textual representation 20 can be omitted if the textual representation 20 is obtained 110a in a standard text representation 21 defined below. The method further comprises identifying 120 at least one textual feature 30 of the textual representation 20 or the standard text representation 21 thereof shown in FIG. 5. The method further comprises assigning 130 at least one feature value to the at least one textual feature 30. The method further comprises generating 140, 140a, 140b visual feedback 10 based on the textual representation 20 or the standard text representation 21 thereof, wherein the generated visual feedback 10 comprises at least one visual feature 40 corresponding to the at least one textual feature 30. The at least one visual feature 40 is amplified based on the at least one feature value assigned to the at least one textual feature 30. In an embodiment, generating 140, 140a, 140b visual feedback 10 can be decomposed into a visual feedback generation part 140a and a visual feedback amplification part 140b. In this case, the order of assigning 130 the at least one feature value to the at least one textual feature 30 and of the visual feedback generation part 140a can be irrelevant, as long as the visual feedback amplification part 140b occurs after assigning 130 at least one feature value. In other embodiments, the visual feedback amplification part 140b cannot be separated from the visual feedback generation part, as amplified visual feedback is generated in 140a. In that case, the visual feedback amplification part 140b may be omitted.

The generated visual feedback 10 comprises one or more of an image, an animated image, a video, and an output text. In examples, the generated visual feedback 10 comprises a video (or an animated image). Such dynamic visual feedback 10 being more entertaining may be advantageous for a user being a child or a pupil. On the other hand, dynamic visual feedback also proves useful in illustrating actions encoded e.g. by verbs (predicates, participles) in the textual representation. The at least one amplified visual feature 40 corresponding to the at least one textual feature 30 is animated, marked and/or highlighted, particularly the at least one amplified visual feature 40 standing out from a further visual feature 40 of the visual feedback 10 corresponding to a further textual feature 30 of the textual representation 20. This advantageously enables a user to study a one-to-one correspondence, if present, between words of the textual representation 20 and corresponding visual features 40. A more complex correspondence (e.g. one visual feature 40 for two textual features 30 as in "red ball") may also be elucidated analogously. The output text may be useful e.g. to correct potential spelling mistakes. Furthermore, output text may be useful when learning a language such as Arabic or Mandarin comprising characters other than the Western alphabet. For example, in Mandarin a user can write a textual representation comprising a pinyin text and obtain hànzì (Chinese characters) as visual feedback or vice versa, particularly on top of another video directed to the linguistic or semantic content. In cases where stroke orders matter, such as e.g. in writing Mandarin hànzì, an animated image of writing strokes in a correct stroke order can be beneficial.

The textual representation 20 comprises text and/or handwriting motion data for a process of handwriting text. Here, text comprises one or more of visual text, printed text, display typed text (e.g. on a screen), handwritten text, and tactile text. An important use case is text written by hand or pen held by a hand of the user. One or more sensors may be used to identify the text written by hand or pen held by the hand of the user. For example, a pen may include a sensor that transmits the motion of the pen (e.g., using a motion sensor, a camera, etc.). Text may be identified based on the sensed motion. As another example, a surface used to write may include one or more sensors (e.g., force sensor, haptic sensor, touch sensor, etc.) configured to detect the text written by hand. Text may be captured using a capturing subsystem 210, as further disclosed herein. Text should be semantically and/or linguistically interpretable with respect to at least one communication language (e.g. a natural language or an artificial language). As an example, text may be linguistically interpretable, if it can be interpreted phrase by phrase, clause by clause, and/or sentence by sentence. As another example, text may be semantically interpretable, if it can be interpreted word by word. Combinations may result from grammar, e.g. "a red ball" needs to be interpreted both semantically and linguistically to grasp its overall meaning.

Figure 5:
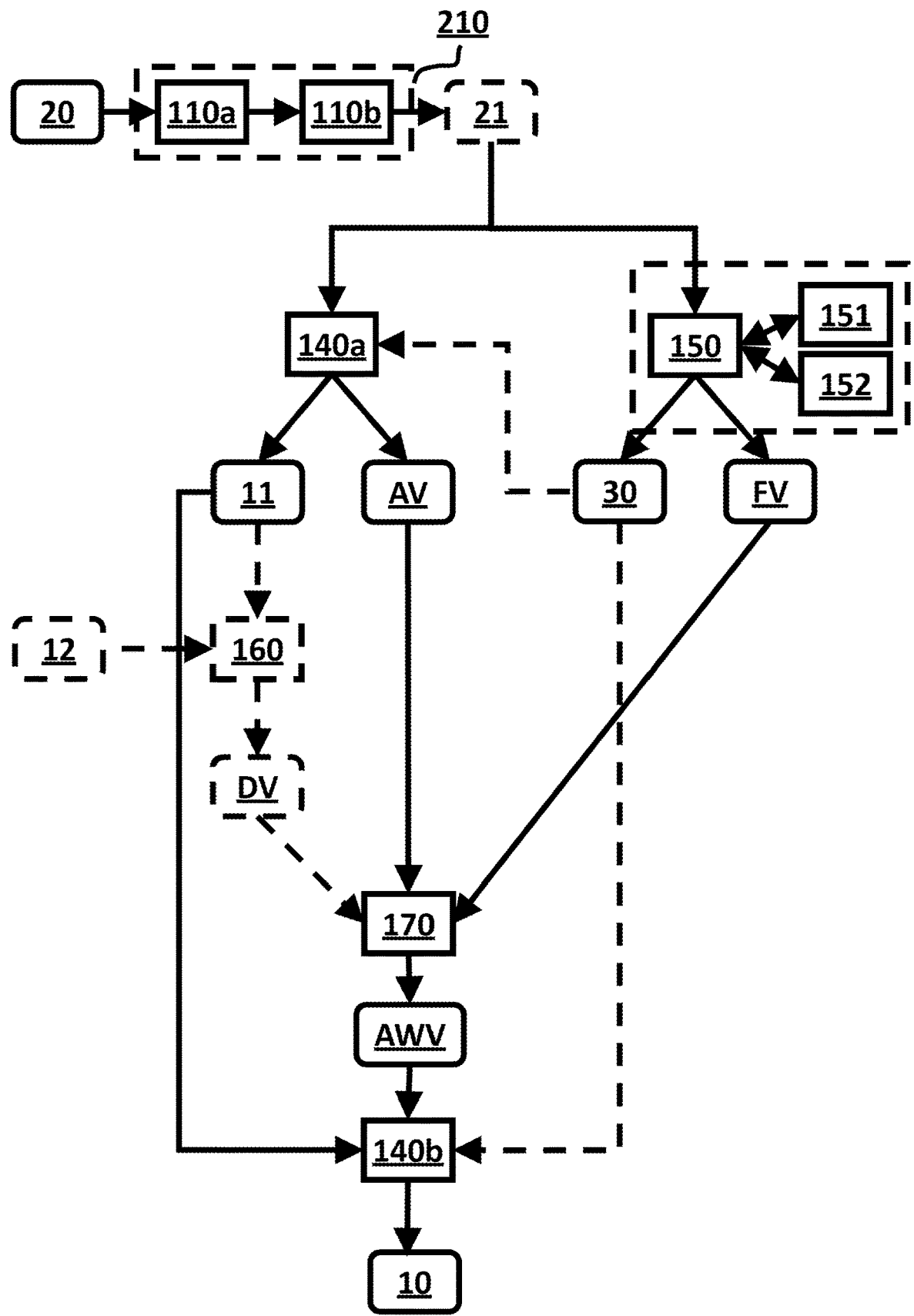
FIG. 5 shows an example embodiment of the computer-implemented method according to the first aspect for generating visual feedback based on a textual representation.

Processing 110b the textual representation 20 may comprise applying an input processing algorithm configured to convert the textual representation 20 to a standard text representation 21 as it can be seen in FIG. 5. Such is advantageous in terms of modularity (with respect to different capturing means) for subsequent algorithms the standard text representation 21 is inputted to. If the textual representation 20 is obtained in the standard text representation 21, processing 110b may become obsolete or optional. The standard text representation 21 may comprise one or more of text in terms of a string of characters, text in terms of a vector graphic or bitmap, text progression in terms of a digital video, and handwriting motion data. As an example, a textual representation of a handwritten text is converted into a string of characters in terms of a character encoding (standard). In case the standard text representation 21 comprises a combination of characters, images, text progression, and handwriting motion data, it may be given in terms of a data structure such as e.g. a list, a nested list, a vector, a matrix, a tensor.

As an example (e.g. for a digital/smart pen), converting the textual representation 20 to the standard text representation 21 may comprise reproducing a text based on corresponding handwriting motion data (e.g., detected via one or more sensors), thus generating a string and/or an image of the text and/or generating a video of text progression. Alternatively, or in addition, converting the textual representation 20 to the standard text representation 21 may comprise recognizing a text from an image of text or from a video of text progression, thus generating a string of characters. Such a conversion may involve (optical) character recognition (O)CR.

Identifying 120 the at least one textual feature 30 of the textual representation 20 may comprise applying a textual feature algorithm 150, as shown in FIG. 5, on the standard text representation 21 of the textual representation 20, thus identifying 120 the at least one textual feature 30 of the textual representation 20 based on the standard text representation 21 of the textual representation 20.

A (any) textual feature 30 may comprise a semantic and/or linguistic feature comprising one or more of one or more characters, one or more words, one or more phrases, one or more grammatical constructions, and one or more punctuation marks in the standard text representation 21. Furthermore, a (any) textual feature 30 may comprise a non-language feature comprising one or more of highlighting (e.g. underlining), tone, and consistency in the standard text representation 21. The textual feature algorithm 150 may be based on learnt or pre-defined rules and/or may be applied using a machine learning model (e.g., the language model 151 disclosed herein, or any other applicable model).

In examples and as shown in FIG. 5, applying the textual feature algorithm 150 may involve applying a language model 151 configured to analyze text of the standard text representation 21 on word, phrase, clause, sentence and/or concept level, thus classifying each textual feature 30. Algorithms for concept extraction from text are known in the literature. Simpler ones can be based on using words to identify terms, and then use terms with a look-up function to identify pre-defined concepts related to those terms. As an example, a textual feature 30 can be classified according to part-of-speech classes "noun", "adjective", "verb", "adverb", and "adverbial". The language model 151 is further configured to assign a feature value to the at least one textual feature 30. Using the language model 151 to also assign feature values, the assignment may depend on what the language model 151 was trained for. For example, if the language model 151 is used to classify words, feature values may be assigned based on word length or word rarity (as compared to the entire corpus the language model 151 has been trained on). If it classifies at the sentence level, it may assign a feature value based on sentence complexity, or sentence length, etc. The feature value assignments can be task-specific, i.e. increased sentence complexity may only be seen as high value in an education setting.

The textual feature algorithm 150 further applies a (feature) value dictionary 152 configured to assign a feature value to the at least one textual feature 30. As an example, value assignments can be predefined in a value dictionary 152 database (e.g. queried by the language model 151). Such predefined assignments may be done by a human, e.g. for a specific purpose. As an example, a teacher may define "high value" words as being the ones relevant to the given study task, or rarer words, or longer words, or words which have increased value within the context of the learning task.

Assigning 130 the at least one feature value to the at least one textual feature 30 may result from the language model 151 and/or the value dictionary 152, thus defining a feature value vector FV. Assigning 130 a feature value to the at least one textual feature 30 may be based on a rating or weighting with respect to language complexity, rarity, importance and/or value. The feature value vector FV may be a list of feature values corresponding to the textual features 30. Two or more feature values can be assigned to a or the at least one textual feature 30.

In an embodiment, generating 140, 140a visual feedback 10 based on the textual representation 20 may comprise querying a database 295 of image primitives and corresponding tags so as to retrieve an image primitive for the at least one textual feature 30 whose tag matches the at least one textual feature 30, thus defining a visual feature 40 corresponding to the at least one textual feature 30. In case of part-of-speech classification, the method may comprise querying a database 295 of image primitives, corresponding tags, and corresponding part-of-speech so as to retrieve an image primitive for the at least one textual feature 30 whose tag matches the at least one textual feature 30 and whose part-of-speech matches the part-of-speech class of the at least one textual feature 30. A (best) match can be determined in terms of a metric criterion on tags and the textual feature (and part-of-speech classes) and comprising a threshold value. An image primitive is a parametrizable image algorithm configured to produce an image, an animated image and/or a video dependent on a parametrization. As an example, such a parametrization can be used to change a scaling and/or a color of the at least one visual feature corresponding to the at least one textual representation. In fact, amplification 140b of the visual feature corresponding to the at least one textual representation may also apply a re-parametrization of the image primitive.

As an example, a textual feature 30 may be a phrase (e.g. "a red ball") comprising a noun and a corresponding adjective. In this case, an image primitive for the noun can be retrieved and parametrized according to the corresponding adjective. Alternatively, or in addition, a textual feature 30 can be a clause or a sentence comprising a noun functioning as a subject and a corresponding verb functioning as a predicate. In this case, an image primitive for the noun can be retrieved and parametrized according to the corresponding verb.

Generating 140, 140a visual feedback 10 based on the textual representation 20 may comprise synthesizing, and in other examples, also parametrizing, a plurality of image primitives in an image, in an animated image or in a video according to a plurality of textual features 30. Generating 140, 140a visual feedback 10 based on the textual representation 20 may further comprise applying an attention algorithm configured to keep track of at least one database retrieval and to record at least one attention value measuring a strength of association between one or more textual features 30, or a combination thereof, and visual features 40, thus generating an attention vector AV.

In an embodiment, generating 140, 140a visual feedback 10 based on the textual representation 20 may comprise providing the standard text representation 21 (or the textual representation) to a generative adversarial network pre-trained and configured to generate an image or a video based on the standard text representation 21, thus generating at least one visual feature 40 corresponding to the textual representation 20. The generative adversarial network may comprise a generator and a discriminator, wherein the generator is further configured to recognize at least one visual feature 40 in the generated visual feedback 10 corresponding to the at least one textual feature 30 and to record at least one attention value measuring at least one correlation between the at least one textual feature 30 and the at least one visual feature 40, thus generating an attention vector AV. As an example, the generative adversarial network can be pre-trained on a training set suitable for the task and before shipping the system 200 for generating visual feedback. Alternatively, or in addition, the system 200 may be configured to allow for online training via a communication link to a network of systems 200 and based on cloud computing. In this case, generated visual feedback should be rated e.g. with a score by qualified users, e.g. teachers or native-speakers (writers).

The attention vector AV may be a list of attention values corresponding to the textual features 30. It may be of the same structure (e.g. size) as the feature value vector FV.

In an embodiment, wherein generating 140, 140*a* visual feedback 10 comprises generating a video, amplification of the at least one visual feature 40 based on the at least one feature value assigned to the at least one textual feature 30 may comprise applying a video difference algorithm 160 configured to identify differences between the generated video and a further video 12. This further (or previous) video may have been created according to the method 100 e.g. in a previous (with respect to time) step based on a previous textual representation. In other words, the method 100 is applied to an input stream of textual representations. On the other hand, the (current) video may be based on the (current) textual representation that may have been altered as the user continues writing or corrects the text. In this case, if the textual representation differs from the previous textual representation, the video may differ from the further (or previous) video. Such difference may, however, be small, in particular, if little time has passed or minor changes were made to the previous textual representation between the current and the previous step.

The video difference algorithm 160 can be further configured to compute a measure of difference for the at least one visual feature 40 both in the generated video and the further video 12, thus generating a difference vector DV. The difference vector DV may be a list of measures of difference corresponding to the textual features 30. It may be of the same structure (e.g. size) as the feature value vector FV. Differences between videos can be identified frame-by-frame and/or on a per pixel basis. Such frames and pixels need to be compatible which can be guaranteed for the input stream of textual representations. A pixel of a frame of the generated video and/or the further video 12 is associated to the at least one visual feature 40. Differences between the at least one visual feature 40 in the generated video and the corresponding visual feature 40 in the further video 12 can be computed from differences between the pixel values associated to the at least one visual feature 40. The difference vector DV may affect amplification weights for the amplification 140*b*. This can be advantageous as amplification can highlight changes from one (the previous) textual representation to another (the current) textual representation.

Amplification of the at least one visual feature 40 based on the at least one feature value assigned to the at least one textual feature 30 may comprise applying an amplification weight algorithm 170 configured to compute at least one amplification weight for the at least one visual feature 40, thus generating an amplification weight vector AWV. The amplification weight vector AWV may be a list of amplification weights corresponding to the textual features 30. It may be of the same structure (e.g. size) as the feature value vector FV. In an embodiment, the at least one amplification weight for the at least one visual feature 40 may depend on the corresponding feature value of the feature vector FV and/or the corresponding attention value of the attention vector AV. In fact, as an example, the at least one amplification weight for the at least one video feature can be a (component-wise) product $$AWV=FV.*AV$$

of the corresponding feature value of the feature vector FV and the corresponding attention value of the attention vector AV. In other embodiments, wherein a difference vector DV is computed, the at least one amplification weight for the at least one visual feature 40 may depend on the corresponding feature value of the feature vector FV and/or the corresponding attention value of the attention vector AV and/or the corresponding difference value of the difference vector DV. In fact, as an example, the at least one amplification weight for the at least one video feature can be a (component-wise) product $$AWV=FV.*AV.*DV$$

of the corresponding feature value of the feature vector FV and the corresponding attention value of the attention vector AV and the corresponding difference value of the difference vector DV.

Amplification 140*b* of the at least one visual feature 40 based on the at least one feature value assigned to the at least one textual feature 30 may comprise applying an amplification algorithm configured to amplify the at least one visual feature 40 based on the corresponding amplification weight of the amplification weight vector AWV. Amplifying 140*b* a visual feature 40 may comprise modifying one or more of shape, size, color(s), tone (e.g. an average color), consistency, and speed of motion relating to the at least one visual feature 40. In some embodiment, wherein generating the visual feedback is based an image primitive being a parametrizable image algorithm, amplifying 140*b* the at least one visual feature 40 may comprise reparametrizing the parametrizable image primitive corresponding to the at least one visual feature 40.

The standard text representation 21, if present, or a portion thereof can be displayed on a graphical user output 230 (of the system 200). Alternatively, or in addition the generated visual feedback 10 can be displayed on the graphical user output 230. Alternatively, or in addition, the generated visual feedback 11 before amplification and/or the generated visual feedback 10 after amplification can be displayed on the graphical user output 230.

The generated visual feedback 10 can be displayed on a graphical user interface 240 (e.g. comprising the graphical user output 230) configured to receive a user interaction. In this case, a visual feature 40 of the displayed generated visual feedback 10 can be selected by the user interaction (hence, by the user), wherein the selected visual feature 40 is amplified, animated and/or highlighted on the graphical user interface 240. Alternatively, or in addition, the standard text representation 21, if present, or a portion thereof can be displayed on a graphical user interface 240 configured to receive a user interaction. In this case, a textual feature 30 of the displayed standard text representation 21 can be selected by the user interaction, wherein the textual feature 30 is amplified, animated and/or highlighted on the graphical user interface 240. Furthermore, the textual feature 30 corresponding to the selected visual feature 40 can be amplified, animated and/or highlighted on the graphical user interface 240. The visual feature 40 corresponding to the selected textual feature 30 can be amplified, animated and/or highlighted on the graphical user interface 240. Interactions of this kind are advantageous for a user to study correspondences between visual features and textual features.

FIG. 5 shows an example embodiment of the computer-implemented method according to the first aspect for generating visual feedback 10 based on a textual representation 20. In examples, visual feedback 10 may depend on the further video 12. The bidirectional arrow between the language model 151 and the textual feature algorithm shall indicate invoking or querying the language model 151. Analogously, the bidirectional arrow between the value dictionary 152 and the textual feature algorithm shall indicate invoking or querying the value dictionary 152.

Figure 2A:
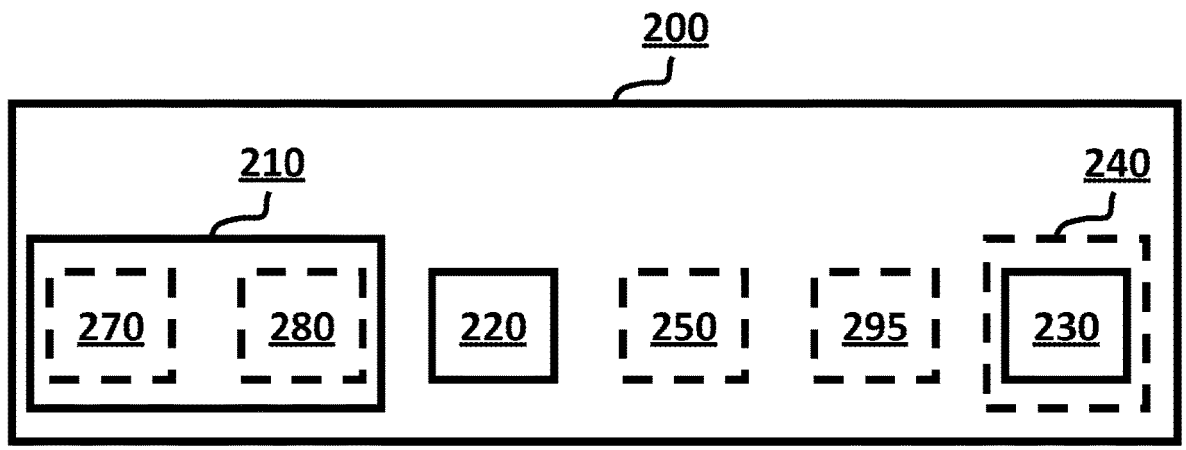

FIG. 2a schematically illustrates a system according to the second aspect for generating visual feedback based on a textual representation. The system 200 for generating visual feedback 10 based on a textual representation 20 comprises a capturing subsystem 210 configured to capture the textual representation 20 provided by a user of the system. The system 200 further comprises a processing subsystem 220 configured to identify at least one textual feature 30 of the textual representation 20 and to generate visual feedback 10 based on the textual representation 20. The system 200 further comprises a graphical user output 230 configured to display the generated visual feedback 10 to the user of the system. The visual feedback 10 generated based on the textual representation 20 comprises at least one visual feature 40 corresponding to the at least one textual feature 30. Alternatively, the system 200 may be defined as the system 200 configured to run the method of the first aspect (or to an embodiment thereof).

As an example, and as schematically illustrated in FIG. 2a, the capturing subsystem 210 may comprise a writing utensil 270 and/or a camera 280. Alternatively, or in addition, the graphical user output 230 may be part of a graphical user interface 240. In addition, the system 200 may comprise a memory 250 and/or a storage/database 295.

Figure 2B:
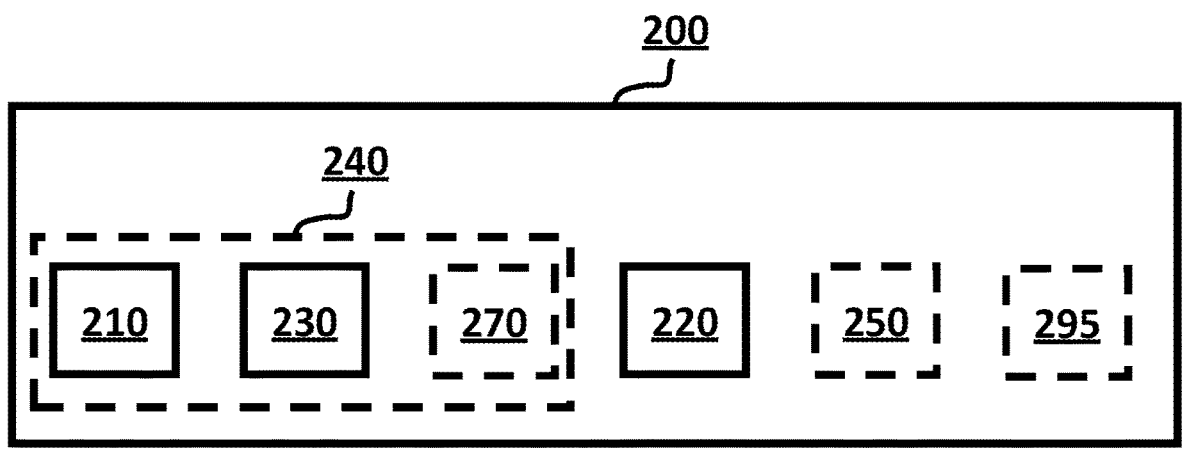
Figure 4A:
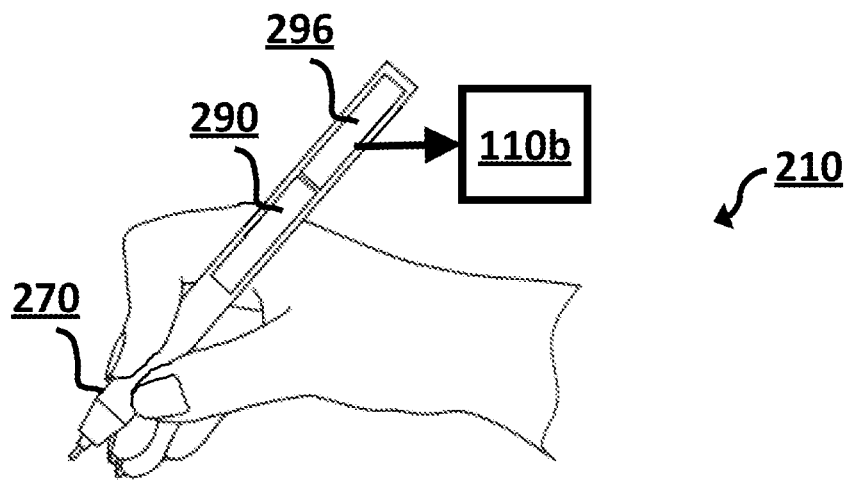
FIG. 4a illustrates an example capturing subsystem with a digital pen, e.g. a smart pen.

In an embodiment, the capturing subsystem 210 may comprise (or be integrated in) a touchpad, a touch screen, or a graphics tablet. In this case, capturing the textual representation 20 provided by the user may comprise capturing text written by hand or pen by the user on the touchpad, the touch screen, or the graphics tablet. As an example, such a system 200 is schematically illustrated in FIG. 2b or depicted in FIG. 4c (e.g. for a smartphone). Here, a graphical user interface 240 may comprise the capturing subsystem 210 and the graphical user output 230. In examples, the graphical user interface 240 may also comprise a writing utensil 270. In addition, the system 200 may comprise a memory 250 and/or a storage/database 295.

Alternatively, or in addition, the capturing subsystem 210 may comprise a keyboard or a virtual keyboard. In this case, capturing the textual representation 20 provided by the user may comprise capturing text inputted by the user using the keyboard or the virtual keyboard.

Figure 2C:
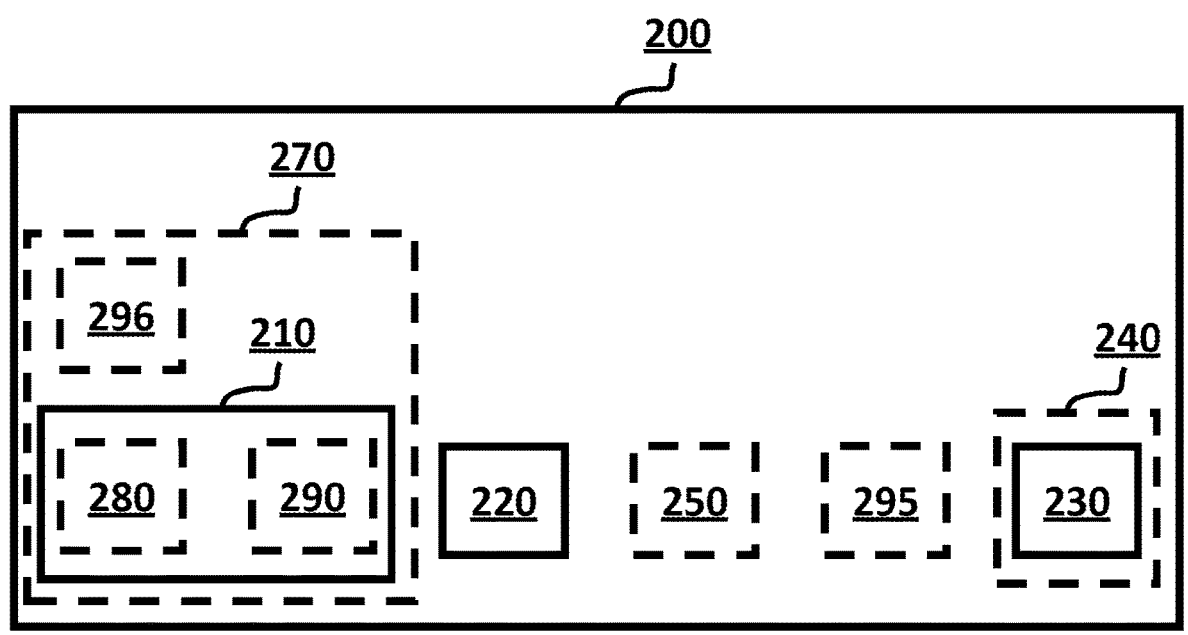

In an embodiment, the capturing subsystem 210 may be integrated in a writing utensil 270, in examples, in a ballpoint pen, a fountain pen, a felt-tip pen, a brush, a pencil, or a digital pen. The digital pen can be a smart pen or a smart brush. Alternatively, the digital pen can be a pen without leaving a trace (e.g. of ink). In this case, the capturing subsystem 210 may comprise a motion sensor module 290 comprising one or more of one or more accelerometers, one or more gyroscopes, one or more magnetometers, and one or more force sensors. The motion sensor module 290 can be configured to capture handwriting motion data comprising one or more of speed, acceleration, and direction of the writing utensil 270 when being used by the user to write text by hand (i.e. not by finger). Capturing the textual representation 20 provided by the user may comprise capturing handwriting motion data of the writing utensil 270 when being used by the user to write text by hand. As an example, such a system 200 is schematically illustrated in FIG. 2c or depicted in FIG. 4a (e.g. for a digital pen/smart pen). Here, the writing utensil 270 may comprise the capturing subsystem 210 which may comprise a camera 280 and/or the motion sensor module 290 and/or a communication module 296 configured to communicate with processing subsystem 220. In examples, the graphical user output 230 may be comprised by the graphical user interface 240. In addition, the system 200 may comprise a memory 250 and/or a storage/database 295. Alternatively, the writing utensil 270 can be optional, when writing without a writing utensil, e.g. using finger paint.

Figure 4B:
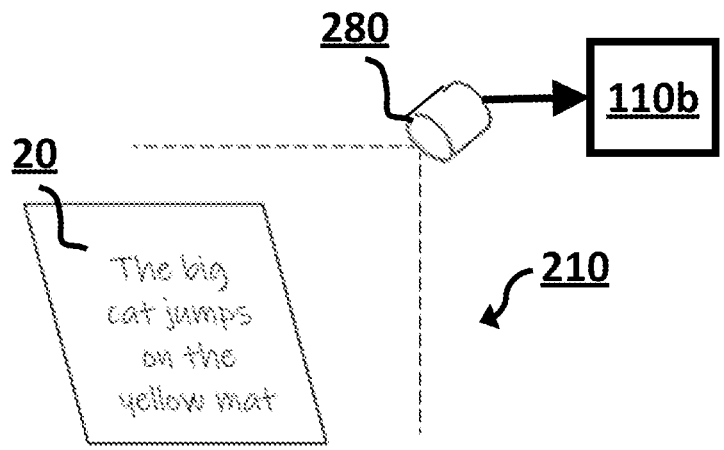
FIG. 4b illustrates an example capturing subsystem with a camera.
Figure 4C:
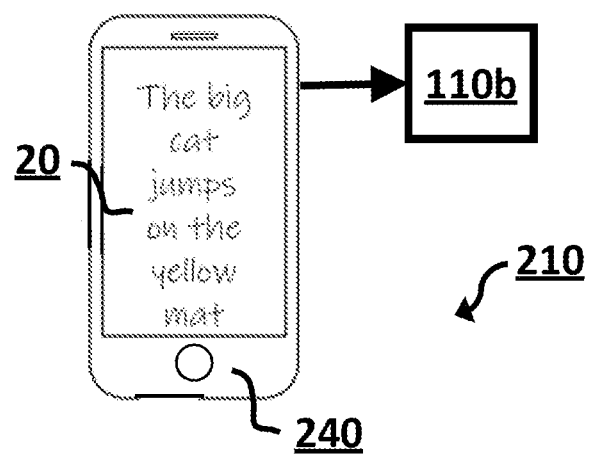
FIG. 4c illustrates an example capturing subsystem with a touchpad, a touch screen, or a graphics tablet.

In an embodiment, the capturing subsystem 210 may comprise at least one camera 280, in examples, an optical camera. An example is depicted in FIG. 4b. The at least one camera can be part of a smartphone or can be mounted on the writing utensil 270. Capturing the textual representation 20 provided by the user may comprise capturing at least one image of a text and/or at least one video of a text using the at least one camera 280. A camera 280 proves useful when capturing text that already exists such as printed text, displayed typed text, or text not written by the user.

In an embodiment, the capturing subsystem 210 can be further configured to capture a time series of textual representations 20 provided by a user of the system, for example as writing progresses. A series of photos can also be taken on existing text (e.g. in order to deal with a page break). Furthermore, the processing subsystem 220 can be further configured to identify at least one current textual feature 30 for a current textual representation 20 of the time series of textual representations 20 and to generate current visual feedback 10 based on the current textual representation 20 and/or at least one previous textual representation 20 of the time series of textual representations 20, as the time series of textual representations 20 progresses, thus generating a time series of textual features 30 and a time series of visual feedback. Here, the graphical user output 230 can be further configured to display the generated current visual feedback 10 to the user of the system 200 as the time series of visual feedback 10 progresses. Furthermore, the current visual feedback 10 generated based on the current textual representation 20 and/or at least one previous textual representation 20 of the time series of textual representations 20 may comprise at least one current visual feature 40 corresponding to the at least one current textual feature 30 and/or to at least one previous textual feature 30 of the time series of textual features 30.

The system 200 may comprise at least one memory 250 configured to be used by the capturing subsystem 210, the processing subsystem 220, and/or the graphical user output 230. Alternatively, or in addition, the system 200 may comprise wired and/or wireless communications modules (e.g. communication module 296) for data exchange between the capturing subsystem 210 and the processing subsystem 220. Alternatively, or in addition the system 200 may comprise wired and/or wireless communications modules for data exchange between the processing subsystem 220 and the graphical user output 230.

The graphical user output 230 may be (or be comprised by) a graphical user interface 240 configured to receive input from the user of the system. The graphical user interface 240 may be configured to enable the user of the system to select or deselect at least one visual feature 40 of the displayed generated visual feedback. Here, the capturing subsystem 210 may comprise the graphical user interface 240.

The system 200 may comprise a database 295 (or a storage 295) of image primitives and corresponding tags or a communication link to a database of image primitives and corresponding tags.

The system 200 or the capturing subsystem 210 or the processing subsystem 220 is configured to run an input processing algorithm configured to generate a standard text representation 21 of the at least one captured textual representation 20. In case of the motion sensor module 290 of the writing utensil 270, the input processing algorithm may be configured to virtually reproduce a handwritten text based on the corresponding captured handwriting motion data corresponding to the textual representation 20, thus generating a text and/or an image of the text and/or generating a video of the text progression. In this case, the standard text representation 21 may comprise one or more of text in terms of a string of at least one character, text in terms of a vector graphic or bitmap, and handwriting motion data for writing a text. Generating 140, 140a, 140b visual feedback 10 based on the textual representation 20 may comprise generating visual feedback 10 based on the corresponding standard text representation 21.

The system 200 may be configured to run the computer-implemented method 100 according to the method of the first aspects (or an embodiment thereof).

Figure 6:
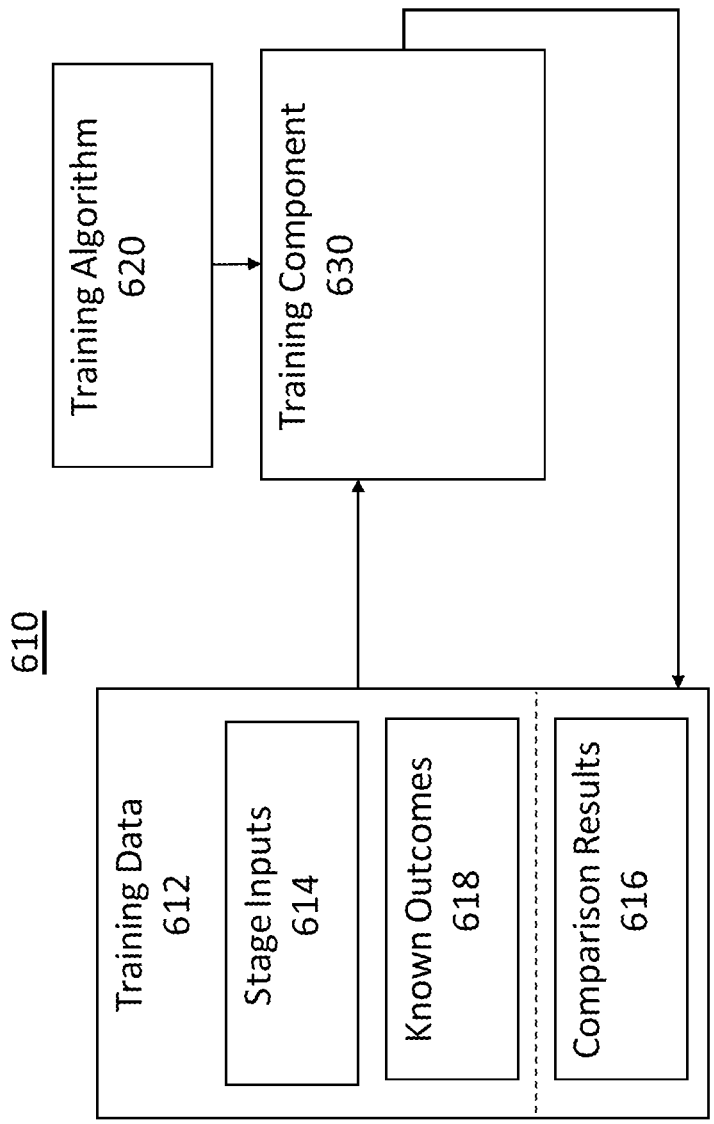
FIG. 6 shows an example machine learning training flow chart.

One or more implementations disclosed herein include and/or may be implemented using a machine learning model. For example, one or more of the input processing algorithm, textual feature algorithm, concept extraction algorithm, parametrizable image algorithm, attention algorithm, video difference algorithm, and/or amplification weight algorithm may implemented using a machine learning model and/or may be used to train a machine learning model. A given machine learning model may be trained using the data flow 600 of FIG. 6. Training data 612 may include one or more of stage inputs 614 and known outcomes 618 related to a machine learning model to be trained. The stage inputs 614 may be from any applicable source including text, visual representations, data, values, comparisons, stage outputs (e.g., one or more outputs from a step from FIGS. 1, 2a, 2b, 2c and/or 5). The known outcomes 618 may be included for machine learning models generated based on supervised or semi-supervised training. An unsupervised machine learning model may not be trained using known outcomes 618. Known outcomes 618 may include known or desired outputs for future inputs similar to or in the same category as stage inputs 614 that do not have corresponding known outputs.

The training data 612 and a training algorithm 620 (e.g., one or more of the input processing algorithm, textual feature algorithm, concept extraction algorithm, parametrizable image algorithm, attention algorithm, video difference algorithm, and/or amplification weight algorithm may implemented using a machine learning model and/or may be used to train a machine learning model) may be provided to a training component 630 that may apply the training data 612 to the training algorithm 620 to generate a machine learning model. According to an implementation, the training component 630 may be provided comparison results 616 that compare a previous output of the corresponding machine learning model to apply the previous result to re-train the machine learning model. The comparison results 616 may be used by the training component 630 to update the corresponding machine learning model. The training algorithm 620 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

A machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIGS. 1, 2a, 2b, 2c and/or 5, may be performed by one or more processors of a computer system as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

Although the present invention has been described above and is defined in the attached claims, it should be understood that the invention may alternatively be defined in accordance with the following embodiments:

1. A computer-implemented method (100) for generating visual feedback (10) based on a textual representation (20), comprising:
    obtaining and processing (110, 110a, 110b) a textual representation (20);
    identifying (120) at least one textual feature (30) of the textual representation (20);
    assigning (130) at least one feature value to the at least one textual feature (30);
    generating (140, 140a, 140b) visual feedback (10) based on the textual representation (20), wherein the generated visual feedback (10) comprises at least one visual feature (40) corresponding to the at least one textual feature (30); and
    wherein the at least one visual feature (40) is amplified based on the at least one feature value assigned to the at least one textual feature (30).

2. The method (100) of embodiment 1, wherein the generated visual feedback (10) comprises one or more of an image, an animated image, a video, and an output text.
3. The method (100) of embodiment 1 or 2, wherein the generated visual feedback (10) comprises a video.
4. The method (100) of one of the preceding embodiments, wherein the at least one amplified visual feature (40) corresponding to the at least one textual feature (30) is animated, marked and/or highlighted, particularly the at least one amplified visual feature (40) standing out from a further visual feature (40) of the visual feedback (10) corresponding to a further textual feature (30) of the textual representation (20).
5. The method (100) of one of the preceding embodiments, wherein the textual representation (20) comprises text and/or handwriting motion data for a process of handwriting text.
6. The method (100) of embodiment 5, wherein text comprises one or more of visual text, printed text, displayed typed text, handwritten text, and tactile text.
7. The method (100) of one of the preceding embodiments, wherein text is semantically and/or linguistically interpretable with respect to at least one communication language.
8. The method (100) of one of preceding embodiments, wherein processing (110*b*) the textual representation (20) comprises applying an input processing algorithm configured to convert the textual representation (20) to a standard text representation (21).
9. The method (100) of embodiment 8, wherein the standard text representation (21) comprises one or more of:
   text in terms of a string of characters; and
   text in terms of a vector graphic or bitmap; and
   text progression in terms of a digital video; and
   handwriting motion data.
10. The method (100) of embodiment 8 or 9, wherein converting the textual representation (20) to the standard text representation (21) comprises reproducing a text based on corresponding handwriting motion data, thus generating a string and/or an image of the text and/or generating a video of text progression.
11. The method (100) of one of the embodiments 8 to 10, wherein converting the textual representation (20) to the standard text representation (21) comprises recognizing a text from an image of text or from a video of text progression, thus generating a string of characters.
12. The method (100) of one of the embodiments 8 to 11, wherein identifying (120) the at least one textual feature (30) of the textual representation (20) comprises applying a textual feature algorithm 150 on the standard text representation 21 of the textual representation (20), thus identifying (120) the at least one textual feature (30) of the textual representation (20) based on the standard text representation 21 of the textual representation (20).
13. The method (100) of embodiment 12, wherein a textual feature (30) comprises a semantic and/or linguistic feature comprising one or more of:
   one or more characters; and
   one or more words; and
   one or more phrases; and
   one or more grammatical constructions; and
   one or more punctuation marks;
   in the standard text representation (21).
14. The method (100) of embodiment 12 or 13, wherein a textual feature (30) comprises a non-language feature comprising one or more of:
   highlighting; and
   tone; and
   consistency;
   in the standard text representation (21).
15. The method (100) of one of the embodiments 12 to 14, wherein the textual feature algorithm 150 applies a language model 151 configured to analyze text of the standard text representation 21 on word, phrase, clause, sentence and/or concept level, thus classifying each textual feature (30).
16. The method (100) of embodiment 15, wherein a textual feature (30) is classified according to part-of-speech classes "noun", "adjective", "verb", "adverb", and "adverbial".
17. The method (100) of embodiment 15 or 16, wherein the language model 151 is further configured to assign a feature value to the at least one textual feature (30).
18. The method (100) of one of the embodiments 12 to 17, wherein the textual feature algorithm 150 further applies a value dictionary 152 configured to assign a feature value to the at least one textual feature (30).
19. The method (100) of embodiment 17 or 18, wherein assigning (130) the at least one feature value to the at least one textual feature (30) results from the language model 151 and/or the value dictionary 152, thus defining a feature value vector (FV).
20. The method (100) of embodiment 19, wherein assigning (130) a feature value to the at least one textual feature (30) is based on a rating or weighting with respect to language complexity, rarity, importance and/or value.
21. The method (100) of embodiment 19 or 20, wherein two or more feature values are assigned to the at least one textual feature (30).
22. The method (100) of one of the preceding embodiments, wherein generating (140, 140*a*) visual feedback (10) based on the textual representation (20) comprises querying a database (295) of image primitives and corresponding tags so as to retrieve an image primitive for the at least one textual feature (30) whose tag matches the at least one textual feature (30), thus defining a visual feature (40) corresponding to the at least one textual feature (30).
23. The method (100) of embodiment 22, when dependent on embodiment 16, comprising querying a database (295) of image primitives, corresponding tags, and corresponding part-of-speech so as to retrieve an image primitive for the at least one textual feature (30) whose tag matches the at least one textual feature (30) and whose part-of-speech matches the part-of-speech class of the at least one textual feature (30).
24. The method (100) of one of embodiment 22 or 23, wherein an image primitive is a parametrizable image algorithm configured to produce an image, an animated image and/or a video dependent on a parametrization.
25. The method (100) of embodiment 24, wherein a textual feature (30) is a phrase comprising a noun and a corresponding adjective, and wherein an image primitive for the noun is retrieved and parametrized according to the corresponding adjective.
26. The method (100) of embodiment 24 or 25, wherein a textual feature (30) is a clause or a sentence comprising a noun functioning as a subject and a corresponding verb functioning as a predicate, and wherein an image primitive for the noun is retrieved and parametrized according to the corresponding verb.
27. The method (100) of one of the embodiments 22 to 26, wherein generating (140, 140*a*) visual feedback (10) based on the textual representation (20) comprises synthesizing, and parametrizing, a plurality of image primitives in an image, in an animated image or in a video according to a plurality of textual features (30).

28. The method (100) of one of the embodiments 22 to 27, wherein generating (140, 140*a*) visual feedback (10) based on the textual representation (20) comprises applying an attention algorithm configured to keep track of at least one database retrieval and to record at least one attention value measuring a strength of association between one or more textual features (30), or a combination thereof, and visual features (40), thus generating an attention vector (AV).

29. The method (100) of one of the embodiments 1 to 21, when dependent on embodiment 8, wherein generating (140, 140*a*) visual feedback (10) based on the textual representation (20) comprises providing the standard text representation 21 to a generative adversarial network pre-trained and configured to generate an image or a video based on the standard text representation 21, thus generating at least one visual feature (40) corresponding to the textual representation (20).

30. The method (100) of embodiment 29, wherein the generative adversarial network comprises a generator and a discriminator, wherein the generator is further configured to recognize at least one visual feature (40) in the generated visual feedback (10) corresponding to the at least one textual feature (30) and to record at least one attention value measuring at least one correlation between the at least one textual feature (30) and the at least one visual feature (40), thus generating an attention vector (AV).

31. The method (100) of one of the preceding embodiments, wherein generating (140, 140*a*) visual feedback (10) comprises generating a video, and wherein amplification of the at least one visual feature (40) based on the at least one feature value assigned to the at least one textual feature (30) comprises applying a video difference algorithm 160 configured to identify differences between the generated video and a further video 12.

32. The method (100) of embodiment 31, wherein the video difference algorithm 160 is further configured to compute a measure of difference for the at least one visual feature (40) both in the generated video and the further video 12, thus generating a difference vector (DV).

33. The method (100) of embodiment 31 or 32, wherein differences between videos are identified frame-by-frame and/or on a per pixel basis.

34. The method (100) of embodiment 33, wherein a pixel of a frame of the generated video and/or the further video 12 is associated to the at least one visual feature (40).

35. The method (100) of embodiment 34, wherein differences between the at least one visual feature (40) in the generated video and the corresponding visual feature (40) in the further video 12 are computed from differences between the pixel values associated to the at least one visual feature (40).

36. The method (100) of one of the preceding embodiments, wherein amplification of the at least one visual feature (40) based on the at least one feature value assigned to the at least one textual feature (30) comprises applying an amplification weight algorithm 170 configured to compute at least one amplification weight for the at least one visual feature (40), thus generating an amplification weight vector (AWV).

37. The method (100) of embodiment 36, when dependent on 19, and 28 or 30, wherein the at least one amplification weight for the at least one visual feature (40) depends on the corresponding feature value of the feature vector (FV) and/or the corresponding attention value of the attention vector (AV).

38. The method (100) of embodiment 37, wherein the at least one amplification weight for the at least one video feature is a product of the corresponding feature value of the feature vector (FV) and the corresponding attention value of the attention vector (AV).

39. The method (100) of embodiment 36, when dependent on 19, and 28 or 30, and 32, wherein the at least one amplification weight for the at least one visual feature (40) depends on the corresponding feature value of the feature vector (FV) and/or the corresponding attention value of the attention vector (AV) and/or the corresponding difference value of the difference vector (DV).

40. The method (100) of embodiment 39, wherein the at least one amplification weight for the at least one video feature is a product of the corresponding feature value of the feature vector (FV) and the corresponding attention value of the attention vector (AV) and the corresponding difference value of the difference vector (DV).

41. The method (100) of one of the embodiments 36 to 40, wherein amplification (140*b*) of the at least one visual feature (40) based on the at least one feature value assigned to the at least one textual feature (30) comprises applying an amplification algorithm configured to amplify the at least one visual feature (40) based on the corresponding amplification weight of the amplification weight vector (AWV).

42. The method (100) of embodiment 41, wherein amplifying (140*b*) a visual feature (40) comprises modifying one or more of:
shape; and
size; and
color; and
tone; and
consistency; and
speed of motion;
relating to the at least one visual feature (40).

43. The method (100) of embodiment 41 or 42, when dependent on 24, wherein amplifying (140*b*) the at least one visual feature (40) comprises reparametrizing the parametrizable image primitive corresponding to the at least one visual feature (40).

44. The method (100) of one of the preceding embodiments, when dependent on embodiment 8, wherein the standard text representation 21 is displayed on a graphical user output (230).

45. The method (100) of one of the preceding embodiments, wherein the generated visual feedback (10) is displayed on a graphical user output (230).

46. The method (100) of one of the preceding embodiments, wherein the generated visual feedback (11) before amplification and/or the generated visual feedback (10) after amplification are displayed on a graphical user output (230).

47. The method (100) of one of the preceding embodiments, wherein the generated visual feedback (10) is displayed on a graphical user interface (240) configured to receive a user interaction.

48. The method (100) of embodiment 47, wherein a visual feature (40) of the displayed generated visual feedback (10) can be selected by the user interaction, wherein the selected visual feature (40) is amplified, animated and/or highlighted on the graphical user interface (240).

49. The method (100) of one of the preceding embodiments, when dependent on embodiment 8, wherein the standard text representation (21) is displayed on a graphical user interface (240) configured to receive a user interaction.
50. The method (100) of embodiment 49, wherein a textual feature (30) of the displayed standard text representation (21) can be selected by the user interaction, wherein the textual feature (30) is amplified, animated and/or highlighted on the graphical user interface (240).
51. The method (100) of embodiment 49 or 50, wherein the textual feature (30) corresponding to the selected visual feature (40) is amplified, animated and/or highlighted on the graphical user interface (240).
52. The method (100) of one of the embodiments 49 to 51, wherein the visual feature (40) corresponding to the selected textual feature (30) is amplified, animated and/or highlighted on the graphical user interface (240).
53. A system (200) for generating visual feedback (10) based on a textual representation (20), comprising:
a capturing subsystem (210) configured to capture the textual representation (20) provided by a user of the system; and
a processing subsystem (220) configured:
to identify at least one textual feature (30) of the textual representation (20) and;
to generate visual feedback (10) based on the textual representation (20); and
a graphical user output (230) configured to display the generated visual feedback (10) to the user of the system; and
wherein the visual feedback (10) generated based on the textual representation (20) comprises at least one visual feature (40) corresponding to the at least one textual feature (30).
54. The system (200) of embodiment 53, wherein the generated visual feedback (10) comprises one or more of an image, an animated image, a video, and an output text.
55. The system (200) of embodiment 53 or 54, wherein the generated visual feedback (10) comprises a video.
56. The system (200) of one of the embodiments 53 to 55, wherein the at least one visual feature (40) corresponding to the at least one textual feature (30) is animated, amplified, marked and/or highlighted, particularly with respect to a further visual feature (40) of the visual feedback (10) corresponding to a further textual feature (30) of the textual representation (20).
57. The system (200) of one of the embodiments 53 to 56, wherein the textual representation (20) comprises text and/or handwriting motion data for a process of handwriting text.
58. The system (200) of embodiment 57, wherein text comprises one or more of visual text, printed text, displayed typed text, handwritten text, and tactile text.
59. The system (200) of one of the embodiments 53 to 58, wherein text is semantically and/or linguistically interpretable with respect to at least one communication language.
60. The system (200) of one of the embodiments 53 to 59, wherein the capturing subsystem (210) comprises a touchpad, a touch screen, or a graphics tablet.
61. The system (200) of embodiment 60, wherein capturing the textual representation (20) provided by the user comprises capturing text written by hand or pen by the user on the touchpad, the touch screen, or the graphics tablet.
62. The system (200) of one of the embodiments 53 to 61, wherein the capturing subsystem (210) comprises a keyboard or a virtual keyboard.
63. The system (200) of embodiment 62, wherein capturing the textual representation (20) provided by the user comprises capturing text inputted by the user using the keyboard or the virtual keyboard.
64. The system (200) of one of the embodiments 53 to 63, wherein the capturing subsystem (210) is integrated in a writing utensil (270), particularly, in a ballpoint pen, a fountain pen, a felt-tip pen, a brush, a pencil, or a digital pen.
65. The system (200) of embodiment 64, wherein the capturing subsystem (210) comprises a motion sensor module (290) comprising one or more of one or more accelerometers, one or more gyroscopes, one or more magnetometers, and one or more force sensors.
66. The system (200) of embodiment 65, wherein the motion sensor module (290) is configured to capture handwriting motion data comprising one or more of speed, acceleration, and direction of the writing utensil (270) when being used by the user to write text by hand.
67. The system (200) of embodiment 65 or 66, wherein capturing the textual representation (20) provided by the user comprises capturing handwriting motion data of the writing utensil (270) when being used by the user to write text by hand.
68. The system (200) of one of the embodiments 53 to 67, wherein the capturing subsystem (210) comprises at least one camera (280), particularly, an optical camera.
69. The system (200) of embodiment 68, wherein capturing the textual representation (20) provided by the user comprises capturing at least one image of a text and/or at least one video of a text using the at least one camera (280).
70. The system (200) of one of the embodiments 53 to 69, wherein the capturing subsystem (210) is further configured to capture a time series of textual representations (20) provided by a user of the system, particularly as writing progresses.
71. The system (200) of embodiment 70, wherein the processing subsystem (220) is further configured:
to identify at least one current textual feature (30) for a current textual representation (20) of the time series of textual representations (20); and
to generate current visual feedback (10) based on the current textual representation (20) and/or at least one previous textual representation (20) of the time series of textual representations (20);
as the time series of textual representations (20) progresses, thus generating a time series of textual features (30) and a time series of visual feedback.
72. The system (200) of embodiment 71, wherein the graphical user output (230) is further configured to display the generated current visual feedback (10) to the user of the system (200) as the time series of visual feedback (10) progresses.
73. The system (200) of embodiment 72, wherein the current visual feedback (10) generated based on the current textual representation (20) and/or at least one previous textual representation (20) of the time series of textual representations (20) comprises at least one current visual feature (40) corresponding to the at least one current textual feature (30) and/or to at least one previous textual feature (30) of the time series of textual features (30).
74. The system (200) of one of the embodiments 53 to 73, comprising at least one memory (250) configured to be used by the capturing subsystem (210), the processing subsystem (220), and/or the graphical user output (230).
75. The system (200) of one of the embodiments 53 to 74, comprising one or more wired and/or wireless communications modules for data exchange between the capturing subsystem (210) and the processing subsystem (220).

76. The system (200) of one of the embodiments 53 to 75, comprising one or more wired and/or wireless communications modules for data exchange between the processing subsystem (220) and the graphical user output (230).

77. The system (200) of one of the embodiments 53 to 76, wherein the graphical user output (230) is a graphical user interface (240) configured to receive input from the user of the system.

78. The system (200) of embodiment 77, wherein the graphical user interface (240) is configured to enable the user of the system to select or deselect at least one visual feature (40) of the displayed generated visual feedback.

79. The system (200) of embodiment 78, wherein the capturing subsystem (210) comprises the graphical user interface (240).

80. The system (200) of one of the embodiments 53 to 79, comprising a database (295) of image primitives and corresponding tags or a communication link to a database of image primitives and corresponding tags.

81. The system (200) of one of the embodiments 53 to 80, wherein the system or the capturing subsystem (210) or the processing subsystem (220) is configured to run an input processing algorithm configured to generate a standard text representation 21 of the at least one captured textual representation (20).

82. The system (200) of embodiment 81, when dependent on embodiment 66, wherein the input processing algorithm is configured to virtually reproduce a handwritten text based on the corresponding captured handwriting motion data corresponding to the textual representation (20), thus generating a text and/or an image of the text and/or generating a video of the text progression.

83. The system (200) of embodiment 81 or 82, wherein the standard text representation 21 comprises one or more of: text in terms of a string of at least one character; and text in terms of a vector graphic or bitmap; and handwriting motion data for writing text.

84. The system (200) of one of the embodiments 81 to 83, wherein generating (140, 140a, 140b) visual feedback (10) based on the textual representation (20) comprises generating visual feedback (10) based on the corresponding standard text representation 21.

85. The system (200) of one of the embodiments 53 to 84, configured to run the computer-implemented method (100) according to embodiments 1 to 52.

REFERENCE NUMERALS 10 visual feedback (after amplification)
11 visual feedback before amplification
12 further video 12
20 textual representation
21 standard text representation
30 textual feature
40 visual feature
100 method for generating visual feedback based on a textual representation
110 obtaining and processing a textual representation
110a obtaining a textual representation
110b processing a textual representation
120 identifying at least one textual feature of a textual representation
130 assigning at least one feature value to the at least one textual feature
140 generating visual feedback based on the textual representation
140a generating visual feedback based on the textual representation
140b amplifying at least one visual feature
150 textual feature algorithm
151 language model
152 value dictionary
160 video difference algorithm
170 amplification weight algorithm
200 system for generating visual feedback based on a textual representation
210 capturing subsystem
220 processing subsystem
230 graphical user output
240 graphical user interface
250 memory
270 writing utensil
280 camera
290 motion sensor module
295 storage, database
296 communication module
FV feature value vector
AV attention vector
DV difference vector
AWV amplification weight vector

The invention claimed is:

1. A computer-implemented method for generating visual feedback based on a textual representation, comprising:
obtaining and processing the textual representation;
identifying at least one textual feature of the textual representation;
assigning at least one feature value to the at least one textual feature; and
generating visual feedback based on the textual representation, wherein the generated visual feedback comprises at least one visual feature corresponding to the at least one textual feature; and
wherein the at least one visual feature is amplified based on the at least one feature value assigned to the at least one textual feature and by identifying one or more differences between the visual feedback and at least one other visual feedback to generate a difference vector.

2. The method of claim 1, wherein the textual representation comprises text and/or handwriting motion data for a process of handwriting text.

3. The method of claim 1, wherein text is semantically and/or linguistically interpretable with respect to at least one communication language.

4. The method of claim 1, wherein generating the visual feedback based on the textual representation comprises querying a database of image primitives and corresponding tags so as to retrieve an image primitive for the at least one textual feature whose tag matches the at least one textual feature, thereby defining a visual feature corresponding to the at least one textual feature.

5. The method of claim 1, wherein generating the visual feedback based on the textual representation comprises synthesizing, and parametrizing, a plurality of image primitives in an image, in an animated image or in a video according to a plurality of textual features.

6. The method of claim 1, wherein generating the visual feedback based on the textual representation comprises providing a standard text representation to a generative adversarial network pre-trained and configured to generate an image or a video based on the standard text representation, thereby generating the at least one visual feature corresponding to the textual representation;

wherein processing the textual representation comprises applying an input processing algorithm configured to convert the textual representation to the standard text representation.

7. The method of claim 1, wherein amplification of the at least one visual feature based on the at least one feature value assigned to the at least one textual feature comprises applying an amplification weight algorithm configured to compute at least one amplification weight for the at least one visual feature, thereby generating an amplification weight vector (AWV).

8. The method of claim 1, wherein the generated visual feedback is displayed on a graphical user interface configured to receive a user interaction.

9. The method of claim 6, wherein the standard text representation comprises one or more of text in terms of a string of characters, text in terms of a vector graphic or bitmap, text progression in terms of a digital video, or handwriting motion data.

10. The method of claim 6, wherein converting the textual representation to the standard text representation comprises reproducing a text based on corresponding handwriting motion data, thus generating a string and/or an image of the text and/or generating a video of text progression.

11. The method of claim 1, wherein assigning the at least one feature value to the at least one textual feature is based on complexity of the at least one textual feature and/or length of the textual representation.

12. A system for generating visual feedback based on a textual representation, comprising:
a capturing subsystem configured to capture the textual representation provided by a user of the system;
a processing subsystem configured to:
identify at least one textual feature of the textual representation; and
generate the visual feedback based on the textual representation;
a graphical user output configured to:
display the generated visual feedback to the user of the system;
wherein the visual feedback generated based on the textual representation comprises at least one visual feature corresponding to the at least one textual feature, and wherein the at least one visual feature is amplified based on at least one feature value assigned to the at least one textual feature and by identifying one or more differences between the visual feedback and at least one other visual feedback to generate a difference vector.

13. The system of claim 12, wherein the textual representation comprises text and/or handwriting motion data for a process of handwriting text.

14. The system of claim 12, wherein the capturing subsystem comprises a touchpad, a touch screen, or a graphics tablet.

15. The system of claim 12, wherein the capturing subsystem is integrated in a writing utensil, particularly, in a ballpoint pen, a fountain pen, a felt-tip pen, a brush, a pencil, or a digital pen.

16. The system of claim 15, wherein the capturing subsystem comprises a motion sensor module configured to capture handwriting motion data comprising one or more of speed, acceleration, and direction of the writing utensil when being used by the user to write text by hand.

17. The system of claim 16, wherein capturing the textual representation provided by the user comprises capturing the handwriting motion data of the writing utensil when being used by the user to write the text by hand.

18. The system of claim 12, wherein the capturing is further configured to capture a time series of textual representations provided by the user of the system, particularly as writing progresses.

19. The system of claim 12, wherein the system or the capturing subsystem or the processing subsystem is configured to run an input processing algorithm configured to generate a standard text representation of the at least one captured textual representation.

20. The system of claim 12, wherein the capturing subsystem comprises at least one camera.

* * * * *